United States Patent [19]

Mason et al.

[11] 4,242,051
[45] Dec. 30, 1980

[54] FEED CONTROL SYSTEM FOR PUMPING FLUIDS TO DISHWASHERS AND THE LIKE

[75] Inventors: William L. Mason, Garden Grove; William K. Russell, Costa Mesa, both of Calif.

[73] Assignee: Knight Equipment Corp., Costa Mesa, Calif.

[21] Appl. No.: 14,041

[22] Filed: Feb. 22, 1979

[51] Int. Cl.³ .................................. F04B 49/00
[52] U.S. Cl. ...................... 417/38; 417/477
[58] Field of Search ............. 417/374, 474, 475, 476, 417/477, 38, 316; 366/151

[56] References Cited

U.S. PATENT DOCUMENTS

| 3,334,285 | 8/1967 | Blake | 417/45 |
| 3,502,034 | 3/1970 | Pickup | 417/475 |
| 3,737,251 | 6/1973 | Berman | 417/477 |
| 3,799,702 | 3/1974 | Weishaar | 417/477 |
| 4,108,575 | 8/1978 | Wilfried | 417/475 |

Primary Examiner—Robert W. Jenkins
Attorney, Agent, or Firm—Willie Krawitz

[57] ABSTRACT

A peristaltic feed pump, driven by a shaded pole motor, is provided to feed sticky, thixotropic fluids such as soaps, detergents, rinse additives, etc., to a dishwasher, chemical reactor, and the like. The shaded pole motor comprises a constant torque, A.C. portion and a D.C. electromagnetic brake portion.

The net effect of the motor enables the fluid to be fed to the dishwasher by the pump within reasonable limits of linearity.

20 Claims, 4 Drawing Figures

FEED CONTROL SYSTEM FOR PUMPING FLUIDS TO DISHWASHERS AND THE LIKE

BACKGROUND OF THE INVENTION

This invention relates to a feed control system employed to feed sticky fluids with a netative, non-linear shear rate. More specifically, this invention relates to the use of a shaded pole motor system comprising an A.C. motor and D.C. brake for driving a peristaltic pump to supply a uniform feed of sticky, thixotropic fluid to dishwashers, chemical reactors, and the like.

Typical fluids, particularly when used in connection with dishwashers, include soaps, detergents, rinse additives, etc. Fluids having both thixotropic and linear flow properties may be pumped simultaneously or separately.

Present commercially available pump devices for feeding fluids to dishwashers include venturi, diaphragm, bellows, and piston pumps. Both the bellows and piston pumps employ a mechanical type of adjustment to vary the length of stroke in the bellows or piston. However, these types of devices are accurate only to within about 5%–15%, and are expensive; also, their check valves tend to foul up when pumping the sticky fluids.

What is required is a control system which can pump small amounts (at least about 1–10 ml/minute) of thixotropic fluids to a dishwasher, chemical reactor and the like, within reasonable limits of about ±1%–2%, even though the load on the pump is non-linear due to the thixotropic nature of the fluids.

THE INVENTION

According to the invention, a control system is provided to drive a peristaltic pump that feeds a sticky fluid having a negative, non-linear shear rate, to dishwashing machines, chemical reactors, etc. The control system includes a shaded pole motor, one portion of the motor operating at a constant torque, and the other portion of the motor being a variable, D.C. powered motor. When operated in the above fashion, a reasonable linear output is imparted to the peristaltic pump to obtain an accuracy of about ±1%–2% when pumping sticky, thixotropic fluids at the rate of at least 1–10 ml/minute.

DESCRIPTION OF THE PREFERRED EMBODIMENT

Figure 1:
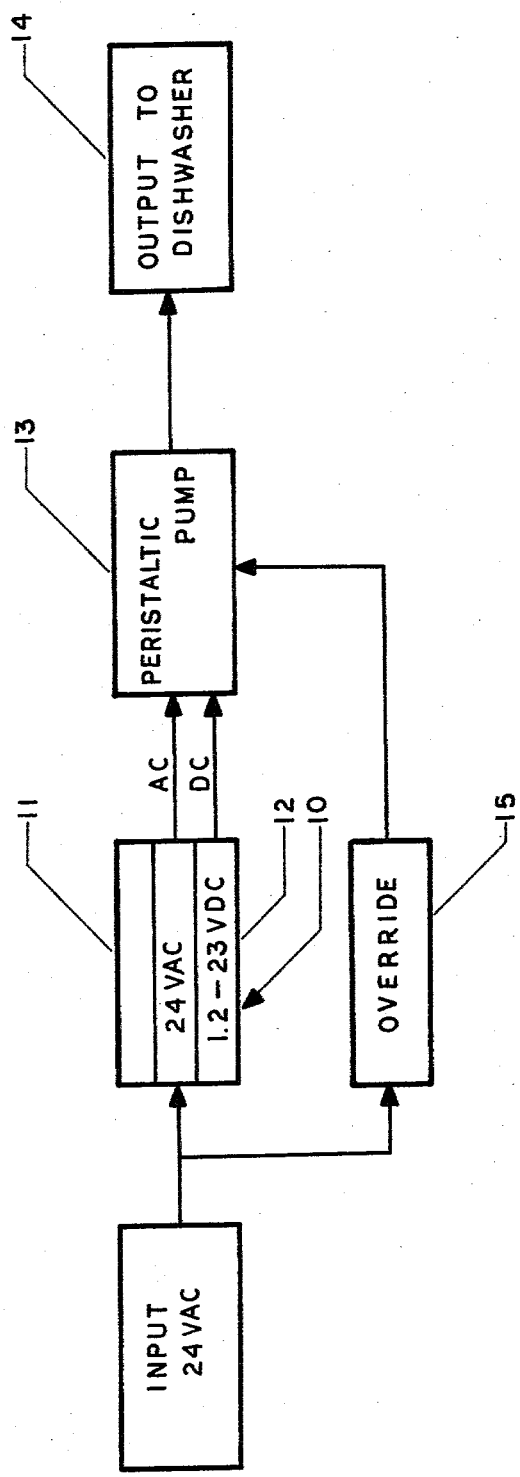
FIG. 1 illustrates in block diagram form, the overall operation of the feed control system of this invention.

The feed control system 10 of this invention is shown schematically in FIG. 1, and comprises an A.C. shaded pole motor 11 connected to a D.C. motor 12 which acts as a brake on the A.C. motor. Power for the D.C. motor is obtained from a rectifier circuit. The motors 11, 12 drive a peristaltic pump 13 which feeds soap, detergent, rinse additives, etc. to a dishwasher 14. If desired, an override 15 (e.g. a low level sensor) may be provided to cut off the pump when the supply of soap, etc. is exhausted or for other safety reasons.

Figure 2:
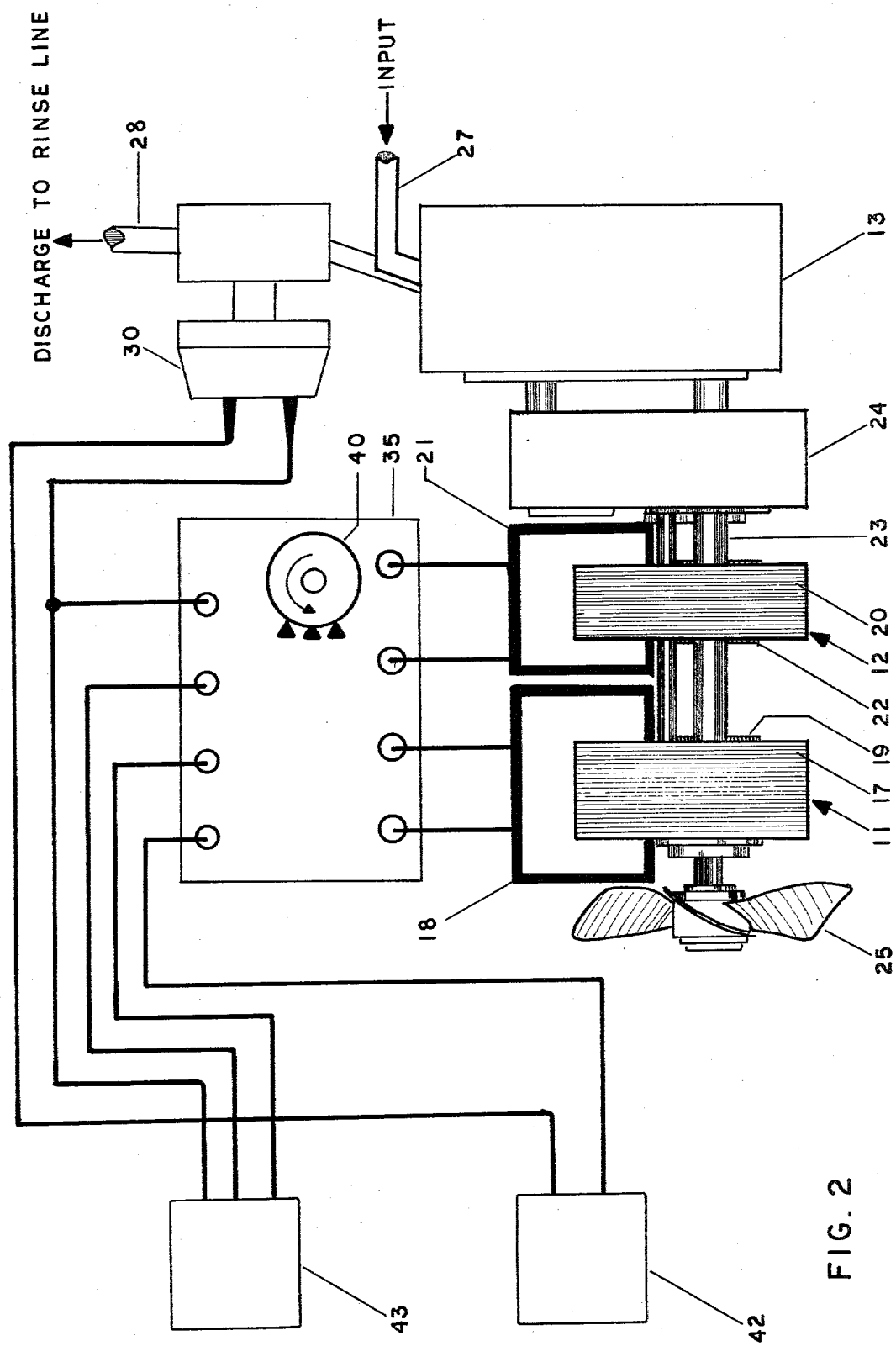
FIG. 2 shows a schematic of the feed pump and control system.

FIG. 2 illustrates a schematic of the feed control components of this invention. The constant torque, A.C. motor 11 includes a laminated core 17, winding 18 and rotor 19, while the variable speed, D.C. motor 12 includes a laminated core 20, winding 21 and rotor 22. A common drive shaft 23 is mounted by the rotors, one end of the shaft driving the peristaltic pump 13 through a gear reducer 24; at the other end, the shaft drives a cooling propellor 25.

An intake line 27 is provided to supply fluid such as degtergent, soap, rinse additive, etc. the the feed pump 13, and an outlet line 28 feeds the pumped fluid to, say, a water inlet line (not shown) which supplies the dishwasher 14. The temperature of the fluid supplied to the dishwasher is usually at room temperature and typically, varies from about 65° F.–75° F. A pressure switch 30 is employed to activate the pump and/or motors when the line 28 to the dishwasher becomes filled with water at the commencement of a cycle.

A circuit panel 35 is provided to mount the circuit components including a speed control switch 40. This switch operates a variable resistance 36 which acts as a potentiometer and set the A.C. motor speed for a given amount of product; the switch 40 is usually pre-set at installation.

A push button switch 42 is employed to activate or turn off the system, and a prime switch 43 primes the system with fluid at the beginning of a cycle by overriding the D.C. brake motor 12 due to flux cancellation. A protective fuse, 44 is provided to cut off the power if the system overheats.

Figure 3:
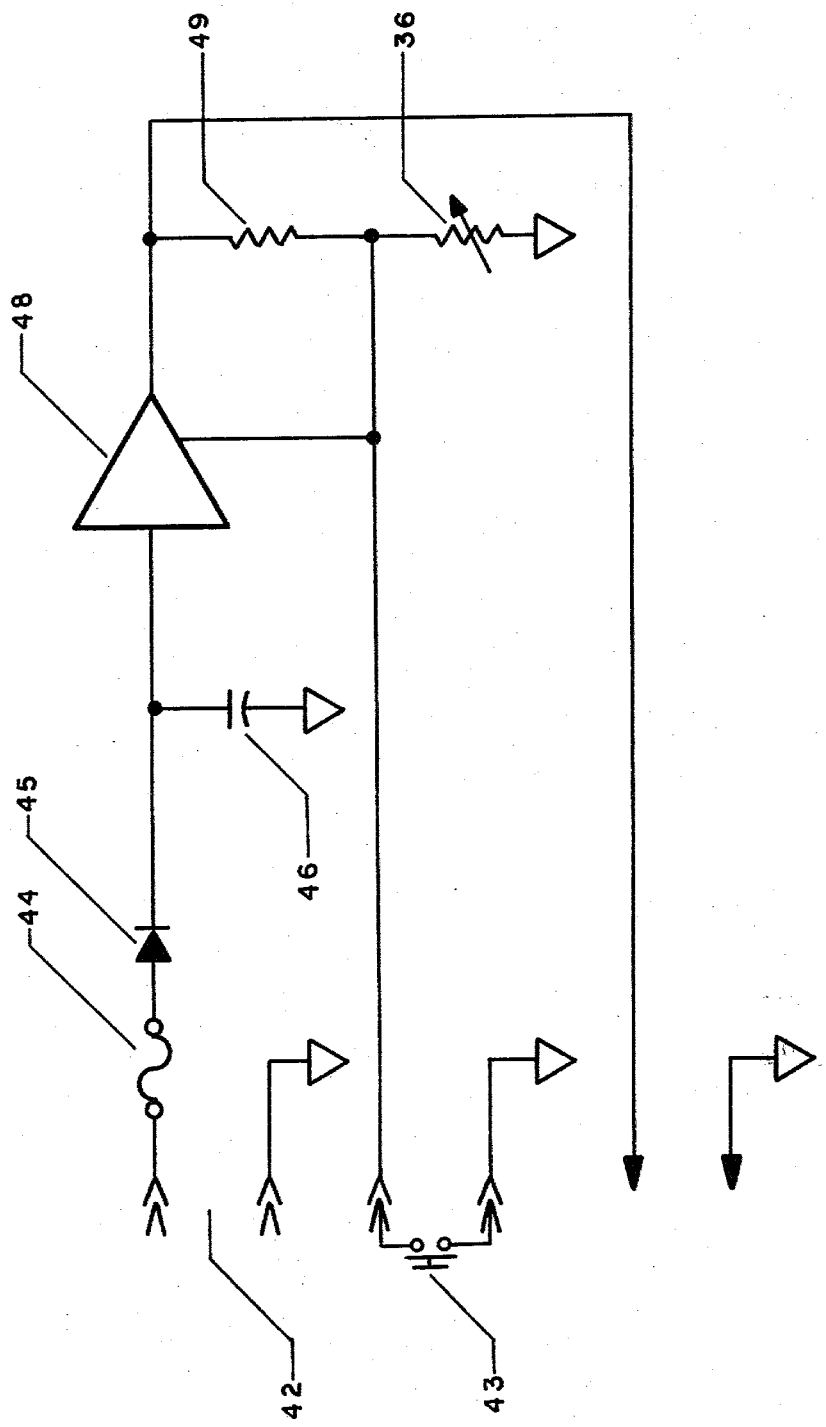
FIG. 3 shows the circuit arrangement for the feed control system.

The circuity for the feed control system is illustrated in FIG. 3 and includes a half wave rectifier and filter for supplying D.C. power to the brake motor 12; the rectifier comprises a diode 45, and the filter is a capacitor 46. The brake control circuit includes an operational amplifier 48 used as a voltage regulator and resistance 49.

Figure 4:
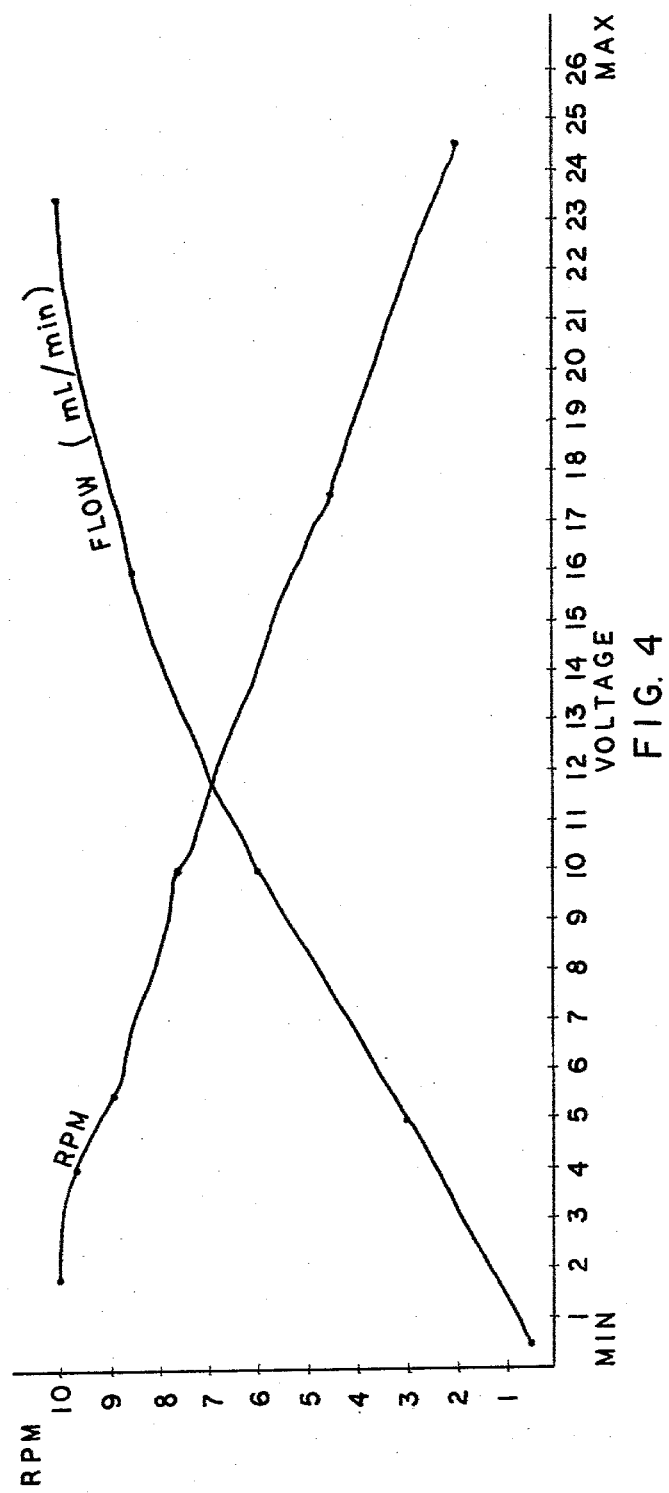
FIG. 4 is a graph showing the linear relation between the shaded pole motor rpm and voltage, expressed in terms of feed rate.

In operation, when the power switch 42 and pressure switch 30 are closed, the A.C. motor will produce an initial power surge. When the prime switch is depressed, the brake motor will turn off and allow a momentary pressure build-up to prime fluid into the intake line 27. After pumping has commenced, the non-linear shear rate properties of the thixotropic fluid will cause a viscosity decrease, and hence, the force on the constant torque, A.C. motor 11 will decrease. However, the tendency of the A.C. motor to return to its origninal setting will be counterbalanced because it must drive the D.C. motor 12 through with increasing speed. Consequently, the fluid output rate is reasonably linear as shown in FIG. 4, which was run very quickly; a more closely controlled experiment would provide a better linearity to within about ±1-2%.

The feed control system of this invention is inexpensive, not only from the standpoint of the pump and motor, but also from the circuitry standpoint. It permits an even supply of detergent, etc. to the dishwasher 14, thereby saving washing ingredients and improving the cleanliness of the dishes and eating utensils. Fouling of feed lines due to the sticky fluid are virtually eliminated and the system easily maintains its prime.

We claim:

1. A feed control system for pumping a fluid having a non-linear shear rate, comprising:
    (a) a peristaltic pump;

(b) a constant torque, A.C. powered shaded pole motor for driving the pump;

(c) a variable speed, D.C. powered shaded pole motor connected to the A.C. motor, and acting as an electromagnetic brake on the A.C. motor; and, (d) an A.C. to D.C. rectifier for supplying D.C. power to the variable speed motor; the peristaltic pump being driven by the A.C. motor, whereby a decrease in viscosity of the fluid casuses a decrease in rotational force to the constant torque motor and a counterbalancing increase in braking power of the variable speed motor, thereby linearizing the flow of fluid to the peristaltic pump.

2. A feed control system for pumping a thixotropic fluid to a dishwasher, chemical reactor, and the like, comprising:
   (a) a peristaltic pump;
   (b) a constant torque, A.C. powered, shaded pole motor;
   (c) a variable speed, D.C. powered motor connected to the constant torque motor and acting as an electromagnetic brake on the constant torque motor; and,
   (d) a rectifier circuit for supplying D.C. power to the variable speed motor;
the peristaltic pump being driven by the A.C. motor, whereby a decrease in viscosity of the thixotropic fluid causes a decrease in rotational force to the constant torque motor and a counterbalancing increase in braking power of the variable speed motor, thereby linearizing the flow of fluid to the pump.

3. The feed control system of claim 1 or 2, in which the fluid is thixotropic and is selected from the class consisting of rinse additives, soaps and detergents.

4. The feed control system of claim 1 or 2, in which the fluid is pumped within about 1%-2% of linearity.

5. The feed control system of claim 1 or 2, in which the fluid is pumped within about 1%-2% of linearity at a rate of about at least 1-10 ml./minute.

6. The feed control system of claim 1 or 2, in which the fluid is pumped within about 1%-2% of linearity at a temperature of about 65° F.-75° F.

7. The feed control system of claim 1 or 2, in which the fluid is pumped within about 1%-2% of linearity at a temperature of about 65° F.-75° F., and at a rate of at least about 1-10 ml./minute.

8. The feed control system of claim 2 including switch means to turn off the brake motor and prime the pump with fluid when pumping is commenced.

9. The feed control system of claim 2, comprising pre-set means to adjust constant torque motor speed to accommodate for viscosity variations between different thixotropic fluids.

10. The feed control system of claim 1 or 2, including an override to the peristaltic pump adapted to cut off the pump.

11. The feed control system of claim 1 or 2, providing a common shaft for the A.C. and D.C. motors.

12. A method for pumping a sticky fluid having a non-linear, negative shear rate, comprising:
   (a) pumping the fluid with a peristaltic pump;
   (b) driving the pump with a constant torque, A.C. powered motor; and,
   (c) breaking the constant torque motor with a variable speed, D.C. powered motor connected to the constant torque motor, whereby, a decrease in viscosity of the fluid due to pumping causes a decrease in rotational force on the constant torque motor and a counterbalancing increase in braking power of the variable speed motor, thereby linearizing the flow of fluid to the peristaltic pump.

13. The method of claim 12 for pumping a sticky, thixotropic fluid to a dishwasher, chemical reactor and the like, comprising:
   (a) pumping a thixotropic fluid with a peristaltic pump;
   (b) driving the pump with a constant torque, A.C. powered motor;
   (c) braking the constant torque motor with a variable speed, D.C. powered motor connected to the constant torque motor; and
   (d) rectifying a portion of the A.C. power to supply D.C. power to the variable speed motor;
whereby, a decrease in viscosity of the thixotropic fluid due to pumping causes a decrease in rotational force on the constant torque variable speed motor, thereby linearizing the flow of fluid to the peristaltic pump.

14. The method of claim 12, in which the fluid is thixotropic.

15. The method of claim 12, in which the A.C. motor is a shaded pole motor.

16. The method of claim 12, in which the fluid is thixotropic and is selected from the class consisting of rinse additives, soaps and detergents.

17. The method of claim 12, in which the fluid is pumped within about 1%-2% of linearity.

18. The method of claim 12, in which the fluid is pumped within about 1%-2% of linearity at a rate of about at least 1-10 ml./minute.

19. The method of claim 12, in which the fluid is pumped within about 1%-2% of linearity at a temperature of about 65° F.-75° F.

20. The method of claim 12, in which the fluid is pumped within about 1%-2% of linearity at a temperature of about 65° F.-75° F., and at a rate of at least about 1-10 ml./minute.

* * * * *